(12) United States Patent
Kiessling et al.

(10) Patent No.: US 7,875,169 B2
(45) Date of Patent: Jan. 25, 2011

(54) LEAKAGE INDICATOR FOR A FILTER ELEMENT OF A FILTER PRESS

(75) Inventors: Holger Kiessling, Görlitz (DE); Manfred Hermann, Nürnberg (DE)

(73) Assignee: JVK Filtration Systems GmbH, Georgensgmünd (DE)

( * ) Notice: Subject to any disclaimer, the term of this patent is extended or adjusted under 35 U.S.C. 154(b) by 1055 days.

(21) Appl. No.: 11/284,386

(22) Filed: Nov. 21, 2005

(65) Prior Publication Data

US 2006/0118470 A1    Jun. 8, 2006

Related U.S. Application Data

(63) Continuation of application No. PCT/EP03/09423, filed on Aug. 26, 2003.

(30) Foreign Application Priority Data

May 19, 2003    (DE) .............................. 203 07 912 U

(51) Int. Cl.
*B01D 25/12* (2006.01)
*B01D 35/143* (2006.01)
*G01M 3/26* (2006.01)

(52) U.S. Cl. .............................. 210/87; 210/90; 210/91; 210/94; 210/228

(58) Field of Classification Search .................. 210/87, 210/90–91, 94, 224–231; 116/268, 271, 116/273, 274

See application file for complete search history.

(56) References Cited

U.S. PATENT DOCUMENTS 2,970,561 A * 2/1961 Ashwood ..................... 116/273
3,126,739 A * 3/1964 Whitehill ..................... 73/861.47
3,358,836 A * 12/1967 Schmitt ......................... 210/90
4,513,184 A * 4/1985 Hughes ..................... 200/81.9 M
5,343,753 A * 9/1994 Boutin ........................... 73/701
5,603,827 A    2/1997 Hermann et al.

FOREIGN PATENT DOCUMENTS

| CH | 345778 | 5/1960 |
|---|---|---|
| DE | 2 214 701 | 10/1973 |
| DE | 36 35 098 A1 | 4/1988 |

(Continued)

OTHER PUBLICATIONS

English Translation of EP 1084742 A1 published Mar. 21, 2001.*

(Continued)

*Primary Examiner*—Terry K Cecil
(74) *Attorney, Agent, or Firm*—Laurence A. Greenberg; Werner H. Stemer; Ralph E. Locher

(57) ABSTRACT

A leakage indicator is provided for a filter element of a filter press, in which the filter element has at least one membrane that can be impinged by a pressure medium. In order to create a leakage indicator that is constructed in a particularly simple manner, an indicator body is freely movable in a flow chamber. Any change in position of the indicator body, which is caused by inflowing or outflowing pressure medium, can be monitored visually or through the use of sensors.

15 Claims, 3 Drawing Sheets

FOREIGN PATENT DOCUMENTS

| | | |
|---|---|---|
| DE | 38 33 145 A1 | 4/1990 |
| DE | 44 15 274 A1 | 11/1995 |
| EP | 0 692 701 A2 | 1/1996 |
| EP | 1 084 742 A1 | 3/2003 |
| FR | 2 818 372 | 6/2002 |
| GB | 900340 | 7/1962 |
| GB | 1 525 382 | 9/1978 |
| JP | 10296009 A | 11/1998 |
| WO | WO 02/41777 A1 | 5/2002 |

OTHER PUBLICATIONS

English translation of Japanese Office Action dated Dec. 8, 2009.

* cited by examiner

LEAKAGE INDICATOR FOR A FILTER ELEMENT OF A FILTER PRESS

CROSS-REFERENCE TO RELATED APPLICATION

This is a continuation application, under 35 U.S.C. §120, of copending International Application No. PCT/EP2003/009423, filed Aug. 26, 2003, which designated the United States; this application also claims the priority, under 35 U.S.C. §119, of German Patent Application 203 07 912.4, filed May 19, 2003; the prior applications are herewith incorporated by reference in their entirety.

BACKGROUND OF THE INVENTION

Field of the Invention

The invention relates to a leakage indicator for a filter element of a filter press, in which the filter element is provided with at least one membrane that can be impinged by a pressure medium. An indicator body is disposed in a freely movable manner in a flow chamber and a change in position of the indicator body caused by inflowing or outflowing pressure medium can be monitored visually or by sensors.

Filter presses with membrane filter elements are also referred to as membrane filter presses and are known from the prior art, for example from German Published, Non-Prosecuted Patent Application DE 44 15 274 A1, corresponding to U.S. Pat. No. 5,603,827. In the case of filter presses of that type, the customary pressure filtration is followed by re-pressing, known as press filtration. In the process, a filter cake that has built up in the filter chamber is freed of residual liquid which is still present. For that purpose, the usually plate-shaped filter element has at least one membrane, so that a pressure-tight pressing space is produced between the filter plate and the membrane. A pressure medium is admitted to the pressure space and makes the membrane expand for pressing out. The pressure medium in that case is usually supplied and removed through a bore located in an edge of the filter element.

If a defect occurs to a membrane or to its fastening, the pressure medium enters into a filter cake space, which is also referred to as a filter chamber, and leaves the filter press together with the filtrate without being noticed. In fact, a loss of pressure medium is established upon major leakage. However, determination of a defective membrane plate in the plate assembly is always very difficult and time-consuming if the filter press has a large number of filter elements.

SUMMARY OF THE INVENTION

It is accordingly an object of the invention to provide a leakage indicator for a filter element of a filter press, which overcomes the hereinafore-mentioned disadvantages of the heretofore-known devices of this general type and which has a particularly simple construction.

With the foregoing and other objects in view there is provided, in accordance with the invention, a leakage indicator for a filter element of a filter press. The filter element has at least one membrane to be impinged by a pressure medium. The leakage indicator comprises a flow chamber. The flow chamber has a central part with a cross section. The flow chamber also has end portions interconnected by the central part. The end portions have cross sections greater than the cross section of the central part. An indicator body is freely movable in the flow chamber, permitting a change in position or displacement of the indicator body caused by inflowing or outflowing pressure medium. The change in position is to be monitored visually or by sensors.

Accordingly, the leakage indicator has an indicator body, which is disposed in a freely movable manner in a flow chamber. The change in position of the indicator body caused by the inflowing or outflowing pressure medium can in turn be monitored visually or by sensors. In order to be able to handle a very large volumetric flow of the pressure medium, the cross section of the end portions of the flow chamber is greater than the cross section of the central part of the flow chamber lying in between.

The invention is substantially based on the fact that, during pressing out, the stream of pressure medium in an intact pressing membrane filter element comes to a standstill when the maximum pressing-out pressure is reached, since the pressing membrane comes to bear against the filter cake and the pressing space is no longer enlarged. While a change in the position of the indicator body is brought about by the flowing pressure medium when the pressing space is being filled or emptied, without such a flow the indicator body remains in a position of rest. If a leakage then occurs at the membrane, the pressure medium flows into the filter chamber and leaves it together with the filtrate. The stream of pressure medium produced in this way deflects the indicator body out of its position of rest. This change in position can be monitored, and consequently serves both for indicating a loss of pressure medium and for localizing a defective membrane filter element. The last point in particular is of great significance whenever the filter press has a multiplicity of filter elements.

The use of an indicator body disposed in a freely movable manner in the flow chamber brings about a significant structural simplification compared to the structures known from the prior art. On one hand, this is because there is no longer any need for all the components that serve for fastening the leakage alerting device (impeller, etc.). On the other hand, the flow chamber can be given very small dimensions, since it then only has to accommodate the freely movable indicator body. As a result, the installation space required for fitting the leakage indicator is reduced.

In accordance with another feature of the invention, there is provided a channel-shaped, that is to say elongate and relatively narrowly confined, flow chamber, which has proven to be particularly well suited for the object of the invention.

In accordance with a further feature of the invention, the chamber advantageously has an inlet opening and an outlet opening for the pressure medium at its respective ends. In other words, the pressure medium enters through the inlet opening at one end of the flow chamber during the filling of the pressing space, flows completely through the flow chamber and, at the opposite end of the flow chamber, enters the filter element through the outlet opening, to act there on the pressing membrane. Compressed air or, in particular to achieve high pressures above 6 bar, water is preferably used as the pressure medium.

In accordance with an added feature of the invention, the central part advantageously has a cross section which corresponds to the inflow cross section, so that trouble-free filling and emptying of the pressing space is possible. Build-ups of the pressure medium can consequently be effectively avoided.

In accordance with an additional feature of the invention, the flow chamber is arcuately formed. The flow chamber preferably describes a virtually complete circle, in particular in such a way that the inlet opening and outlet opening are at the same level.

In accordance with yet another feature of the invention, the indicator body moves of its own accord into a position of rest as soon as there is no flow of the pressure medium. A starting or neutral position is defined by this position of rest. Any deviation from this position of rest consequently indicates the occurrence of a pressure medium flow, that is a leakage in the case of an already filled filter element. If the flow chamber is disposed in such a way that the inlet opening and the outlet opening are above the central part, the indicator body in effect falls into the central part and finds its position of rest there.

In accordance with yet a further feature of the invention, the indicator body closes the flow chamber almost completely in the region of its central part, that is in its position of rest. Therefore, a change in position of the indicator body takes place even when there are the smallest volumetric flows of the pressure medium, so that a very high sensitivity of the leakage indicator can be achieved.

At the same time, the bend of the flow chamber is of great significance for the manner of the indication. If the indicator body is deflected from its position of rest in the central part of the flow chamber, its inertia must first be overcome. At the same time, because of the arcuate configuration of the flow chamber, and in particular of the central part, the indicator body is raised when there is a flow of the pressure medium. Due to being constrained in the bent central part, this raising takes place along the path of an arc of a circle, so that the force of the flowing pressure medium required for deflecting the indicator body has an additional component which is distinguished by a sinusoidal function corresponding to the arc of the circle. This makes it possible to register both very small and very large pressure medium flows in terms of their quantity as well. This is in contrast to a central part which is straight and for example extends horizontally, in the case of which an indicator body under the influence of the pressure medium would be deflected completely in the direction of the outlet or inlet opening in one motion, and a quantitative evaluation of the deflection of the indicator body would not be possible.

In accordance with yet an added feature of the invention, the indicator body is preferably cylindrical and preferably lies with its cylinder end faces almost against the end faces of the flow chamber, so that the flow chamber forms a kind of guide for the indicator body. When the pressure medium flows through, the indicator body serves as it were as a float, while it moves in the flow chamber in the manner of a rolling body when there is no pressure medium flow. The indicating sensitivity of the indicator body can be varied by the indicator body being produced as a hollow cylinder and/or from materials of different density, for example from metal, plastic or other materials. Instead of a cylindrical indicator body, a spherical indicator body or indicator body with some other geometrical shape may of course also be used.

In accordance with yet an additional feature of the invention, it is particularly advantageous if shut-off elements are provided ahead of the inlet and outlet openings in the flow chamber. This prevents blocking of these openings by the indicator body.

In accordance with again another feature of the invention, a corresponding viewing plate is provided as a covering of the flow chamber. The deflecting of the indicator body from its position of rest can then be observed from the outside.

In accordance with again a further feature of the invention, the registering of the change in position of the indicator body or the registering of the position of the indicator body can also take place through the use of electrical or other sensors. At the same time, in this case a leakage occurring can be indicated by corresponding indicating aids, for example optical signal transmitters.

In accordance with a concomitant feature of the invention, the inlet and outlet openings disposed in the flow chamber are connected outside the flow chamber to corresponding respective supply and removal lines. The placement of these supply and removal lines on the leakage indicator is freely selectable and variable, so that the leakage indicator may be provided in the pressure medium supply line, separately from the filter element, or else be provided directly on the filter element, for which the leakage indicator has correspondingly formed mounting elements.

Other features which are considered as characteristic for the invention are set forth in the appended claims.

Although the invention is illustrated and described herein as embodied in a leakage indicator for a filter element of a filter press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
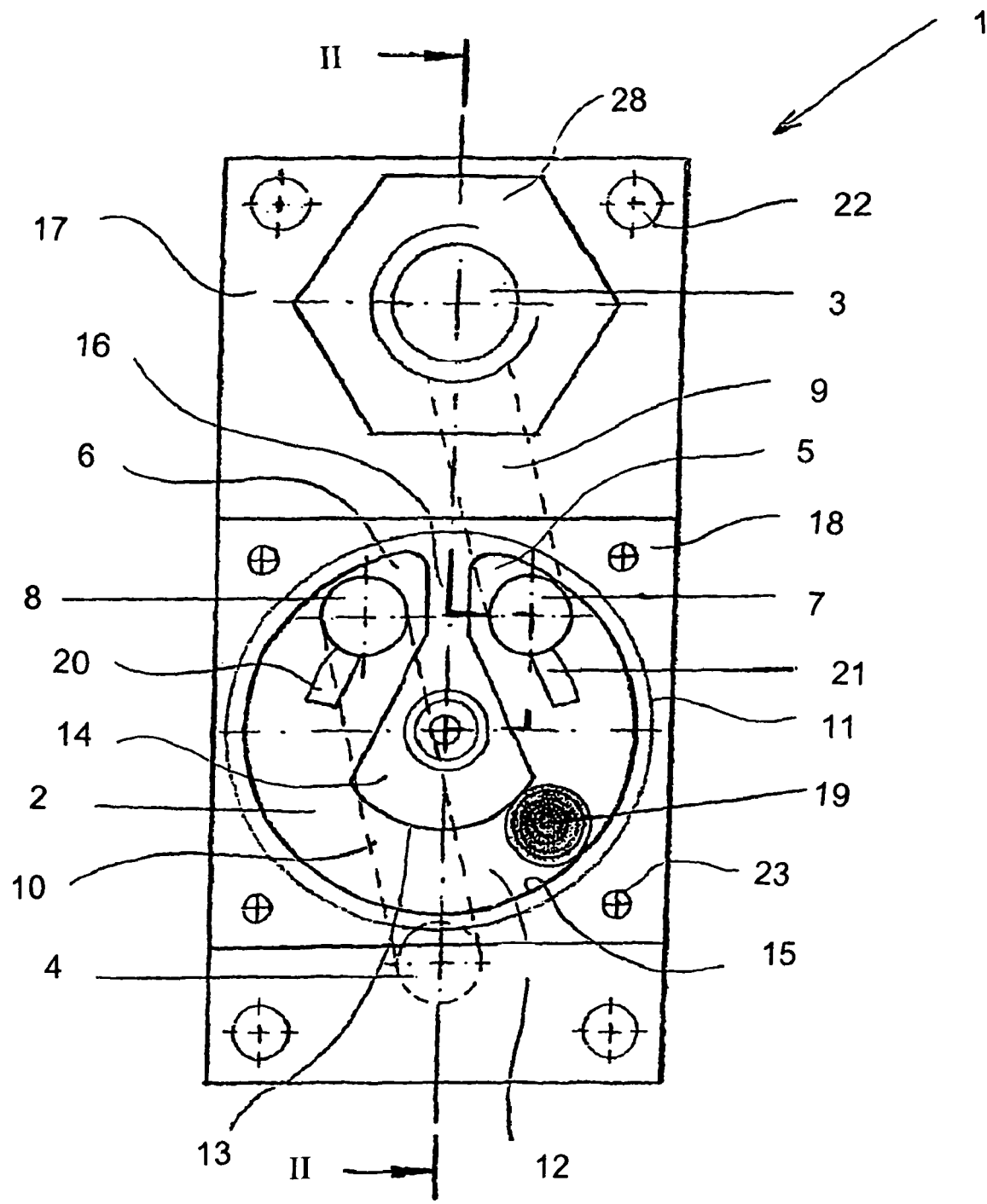
FIG. 1 is a diagrammatic, front-elevational view of a leakage indicator according to the invention.

Referring now to the figures of the drawings in detail and first, particularly, to FIG. 1 thereof, there is seen a front view of a leakage indicator 1 according to the invention. The leakage indicator 1 has a flow channel or flow chamber 2, which is disposed between a pressure medium supply line 3, disposed above the flow channel 2, and a pressure medium removal line 4, disposed underneath the flow channel 2. The flow channel 2 is arcuately formed and has an opening disposed in each of its end portions 5, 6, serving as an inlet opening 7 and an outlet opening 8 for the pressure medium flowing through the flow channel 2. The inlet opening 7 and the outlet opening 8 are connected to the pressure medium supply line 3 and the pressure medium removal line 4 by respective connecting channels 9, 10. It goes without saying that it is likewise possible to connect the inlet and outlet openings 7, 8 directly to the respective pressure medium supply line 3 and the pressure medium removal line 4, without connection channels, so that a required installation or fitting space for the leakage indicator 1 is further reduced.

The flow channel or flow chamber 2 is formed in such a way that it is shaped in the form of an arc of a circle in a round opening 11 of the leakage indicator 1. In this case, the end portions 5, 6 of the flow channel 2 have a greater cross section than a central part 12 of the flow channel 2, lying between these end portions 5, 6. The central part 12 is bounded on one hand by an end face 13 of a circular-segmental separating element 14 and on the other hand by a rim 15 of the round opening 11 lying opposite to the end face 13. The separating element 14 is disposed approximately centrally in the round opening 11 and is connected to the rim 15 of the round opening 11 through the use of a connecting web 16. The separating element 14 subdivides the round opening 11 into two flow channel halves disposed mirror-symmetrically relative to each other.

A cylindrical indicator body 19 is guided between a base part 17 of the leakage indicator 1, in which the round opening 11 has been made, and a front covering 18, closing off the round opening 11 and with it the flow channel or flow chamber 2. The indicator body 19 closes off the flow channel 2 almost completely in the region of its central part 12. If the indicator body 19 is located in the region of the end portions 5, 6 of the flow channel 2, cam-shaped shut-off elements 20, 21, which are respectively provided ahead of the inlet opening 7 and outlet opening 8, prevent the indicator body 19 from blocking the outlet opening 8 and the inlet opening 7 during filling and emptying. Boreholes 22 which are provided in all four corners of the base part 17 for forming screw connections or the like, serve for fastening the leakage indicator 1 to a non-illustrated filter element.

The covering 18, which closes off the flow channel 2 toward the front, is formed completely as a transparent viewing plate, so that observation of a change in position of the indicator body 19 is possible from the outside. It goes without saying that it is also possible to use a covering which is only partly transparent, that is in the region of the flow channel 2. The covering 18 is securely fastened to the base part 17 of the leakage indicator 1 by screws 23.

Figure 2:
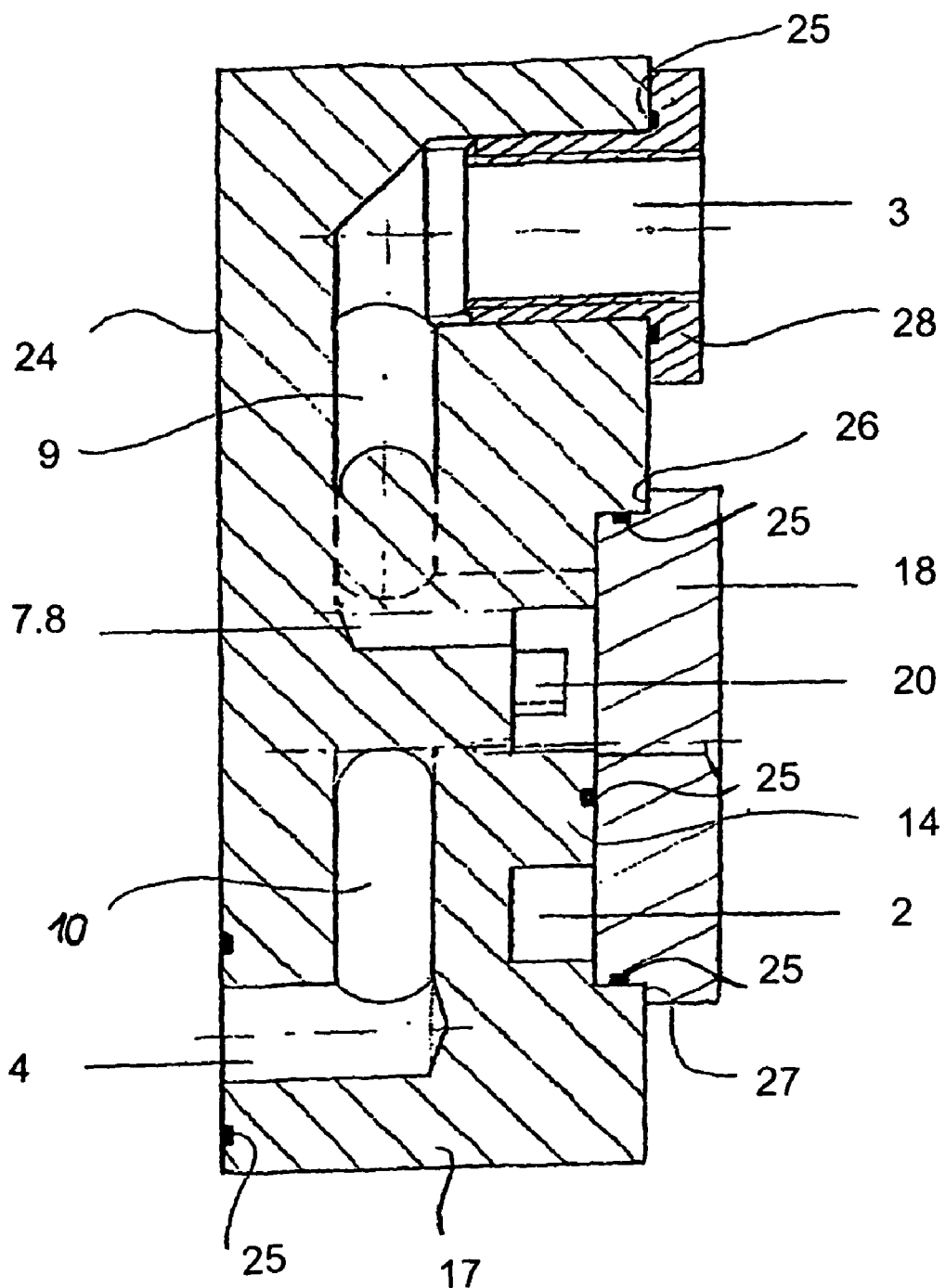
FIG. 2 is a sectional view of the leakage indicator, which is taken along a line II-II of FIG. 1, in the direction of the arrows.

FIG. 2 shows a sectional representation of the leakage indicator 1 according to the invention, which is taken along a line II-II of FIG. 1, in the direction of the arrows. For the sake of overall clarity, the indicator body is not shown in FIG. 2. The base part 17 is preferably produced from a metal material or a plastic. The round opening 11 and similarly the special configuration of the flow channel 2 with the separating element 14 and the inlet and outlet openings 7, 8 as well as the connecting channels 9, 10, are made in the base part 17 by conventional machining methods, for example milling.

The pressure medium removal line 4 is configured in such a way that it can be connected directly to a pressure medium connection of the filter element 30, for example a filter plate. For this purpose, a rear side 24 of the leakage indicator 1 is formed in a correspondingly planar manner. The pressure medium supply line 3 and removal line 4 are sealed by sealing elements 25, for example sealing rings. A special connecting piece 28 which is adapted in a manner corresponding to a dimensioning used in this case for the non-illustrated pressure medium connection, is introduced into the pressure medium supply line 3.

The transparent covering 18 has recesses 26 on its outer edges, facing the flow channel or flow chamber 2. The transparent covering 18 is supported on one hand on shoulders 27 of the base part 17, which are formed on both sides of the round opening 11 and engage in the recesses 26, and on the other hand on the separating element 14. The covering 18 is likewise provided with sealing elements 25 with respect to the shoulders 27 and the separating element 14.

Figure 3:
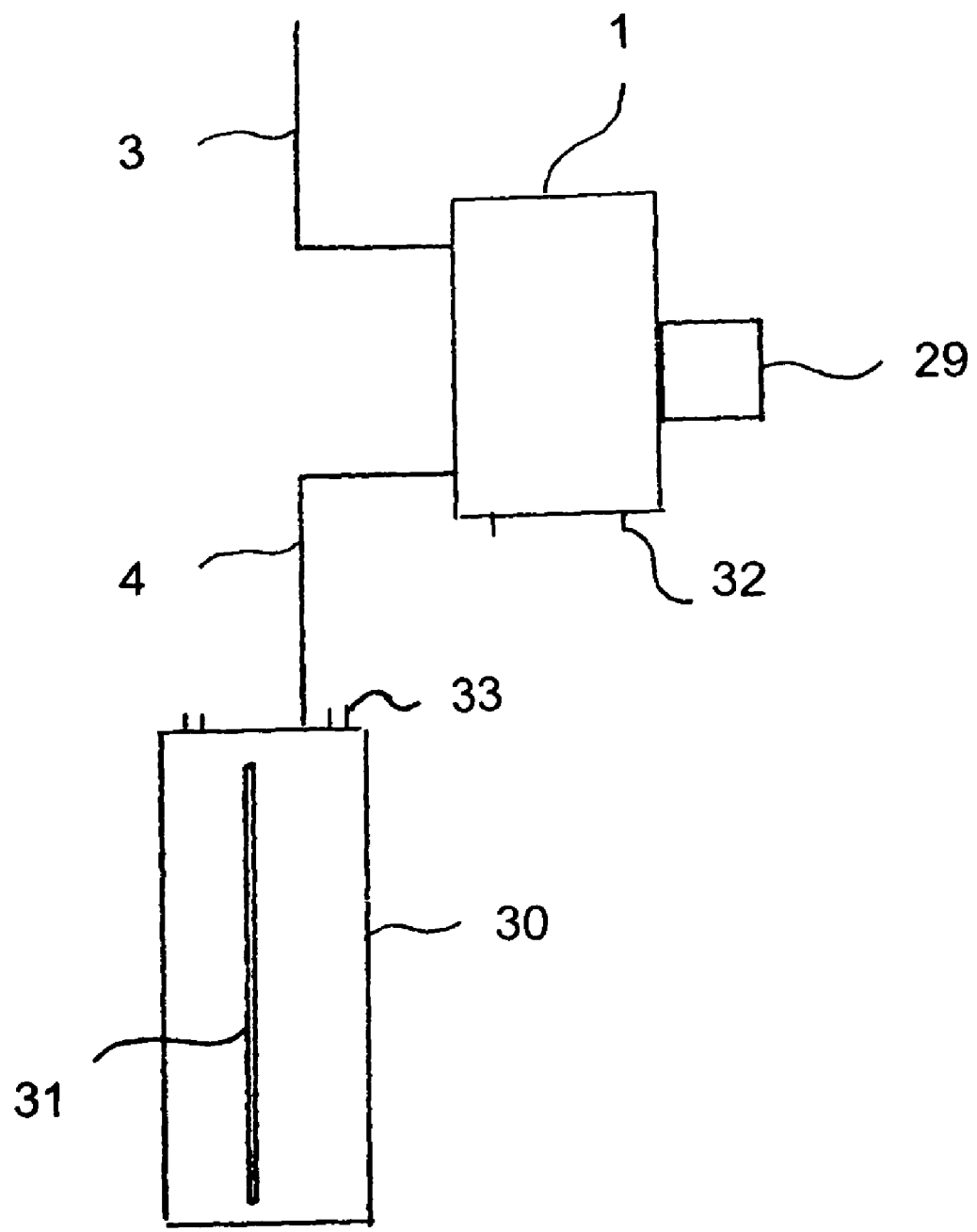
FIG. 3 is a block diagram showing a filter element connected to the leakage indicator.

FIG. 3 shows that the pressure medium removal line 4 leads to the filter element 30 of a filter press. A membrane 31 which is impinged by pressure medium is disposed inside the filter element 30. At least one electrical sensor 29 is disposed at the leakage indicator 1 for registering the position and/or a change in position of the indicator body 19. It is also noted that the leakage indicator 1 may not only be provided in the pressure medium supply line 1, separately from the filter element 30, but it may also be provided directly on the filter element 30, for which purpose the leakage indicator and the filter element have correspondingly formed mounting elements 32, 33, respectively.

We claim:

1. A leakage indicator for a filter element of a filter press, the filter element having at least one membrane to be impinged by a pressure medium, the leakage indicator comprising:

a flow chamber having an arcuate shape, said flow chamber being defined by a separating element and a circular surface opposite said separating element and also by two opposed substantially planar surfaces, said flow chamber having a central part with a cross section, and said flow chamber having end portions interconnected by said central part, said end portions having cross sections greater than said cross section of said central part and said end portions being connected to the filter element to permit the pressure medium to flow between the filter element and said end portions, said flow chamber having ends and an inlet opening and outlet opening respectively disposed at said ends;

an indicator body freely movable in said flow chamber permitting a change in position of said indicator body caused by inflowing or outflowing pressure medium from or to the filter element, said change in position to be monitored visually or by sensors, said indicator body being dimensioned for maintaining an adequately large open cross section for unhindered filling and emptying of the filter element, when said indicator body is positioned in one of said end portions; and shut-off elements disposed at said ends of said flow chamber and preventing blocking of said inlet and outlet openings by said indicator body.

2. The leakage indicator according to claim 1, wherein said flow chamber has a channel shape.

3. The leakage indicator according to claim 1, wherein said flow chamber describes a virtually complete circle.

4. The leakage indicator according to claim 3, wherein said indicator body is cylindrical.

5. The leakage indicator according to claim 1, wherein said flow chamber permits said indicator body to move of its own accord into a position of rest in said central part of said flow chamber, without a flow of the pressure medium.

6. The leakage indicator according to claim 1, wherein said indicator body is dimensioned for almost completely closing said flow chamber in the vicinity of said central part.

7. The leakage indicator according to claim 1, wherein said indicator body is cylindrical.

8. The leakage indicator according to claim 1, which further comprises a covering closing off said flow chamber from the outside and providing a viewing plate.

9. The leakage indicator according to claim 1, which further comprises electrical sensors for registering at least one of a position or change in position of said indicator body.

10. The leakage indicator according to claim 1, which further comprises mounting elements for placement relative to a pressure medium supply line of the filter element or for direct placement on the filter element.

11. The leakage indicator according to claim 1, wherein said shut-off elements are cam-shaped shut-off elements respectively disposed ahead of said inlet opening and said outlet.

12. The leakage indicator according to claim 1, wherein said indicator body is cylindrical and disposed with a longitudinal axis of said indicator body orthogonal to said substantially planar surfaces.

13. A filter press assembly, comprising:

a filter element including at least one membrane to be impinged by a pressure medium; and a leakage indicator including an arcuate flow chamber and an indicator body, said flow chamber being defined by a separating element and a circular surface opposite said separating element and also by two opposed substantially planar surfaces;

said flow chamber having a central part with a cross section, end portions interconnected by said central part, said end portions having cross sections greater than said cross section of said central part, and inlet and outlet openings each connected to a respective one of said end portions;

said inlet and outlet openings being connected to said filter element to permit the pressure medium to flow between said filter element and said end portions;

said indicator body being freely movable in said flow chamber permitting a change in position of said indicator body caused by inflowing or outflowing pressure medium from or to said filter element, said change in position to be monitored visually or by sensors, said indicator body being dimensioned for maintaining an adequately large open cross section for unhindered filling and emptying of the filter element, when said indicator body is positioned in one of said end portions; and shut-off elements disposed at said ends of said flow chamber and preventing blocking of said inlet and outlet openings by said indicator body.

14. A leakage indicator for a filter element of a filter press, the filter element having at least one membrane to be impinged by a pressure medium, the leakage indicator comprising:

an arcuate flow chamber and an indicator body, said flow chamber being defined by a separating element and a circular surface opposite said separating element and also by two opposed substantially planar surfaces;

said flow chamber having a central part with a cross section, end portions interconnected by said central part, said end portions having cross sections greater than said cross section of said central part, and inlet and outlet openings each connected to a respective one of said end portions;

said inlet and outlet openings being connected to the filter element to permit the pressure medium to flow between the filter element and said end portions;

said indicator body being freely movable in said flow chamber permitting a change in position of said indicator body caused by inflowing or outflowing pressure medium from or to said filter element, said change in position to be monitored visually or by sensors; and shut-off elements disposed at said ends of said flow chamber and preventing blocking of said inlet and outlet openings by said indicator body.

15. The leakage indicator according to claim 14, further comprising a connecting web connecting said separating element to said circular surface.

* * * * *